No. 777,567. PATENTED DEC. 13, 1904.
T. L. TAYLOR & E. C. BOECK.
PRUNING SHEARS.
APPLICATION FILED APR. 4, 1904.
NO MODEL.
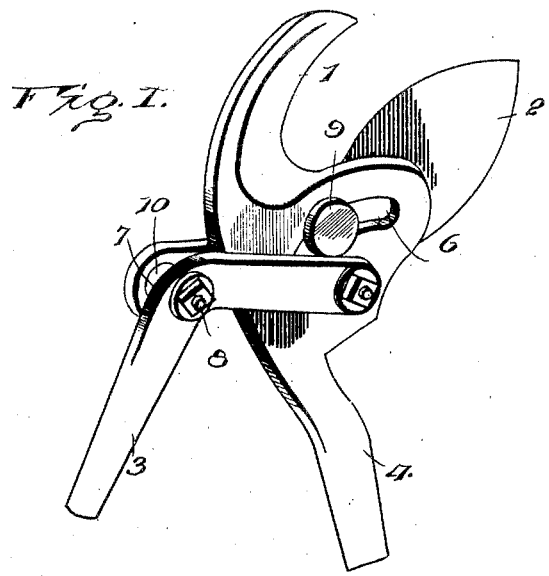
Fig. 1.
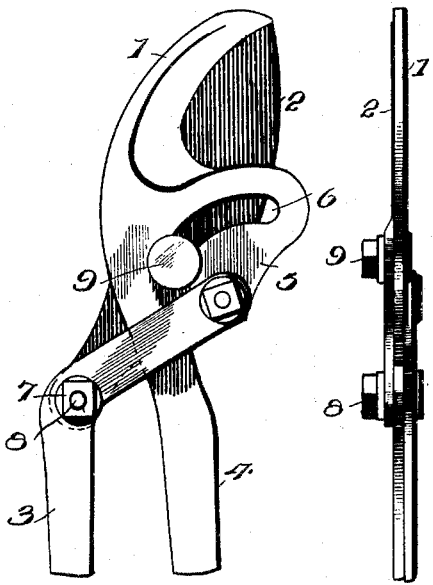
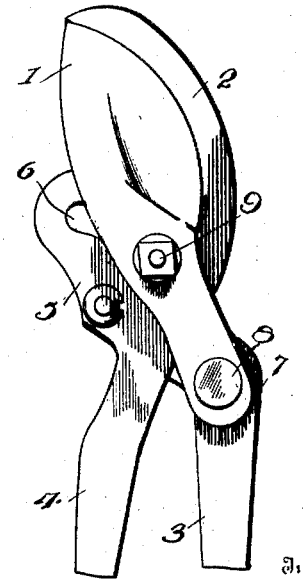
Fig. 2.   Fig. 3.   Fig. 4.
Witnesses
Inventors
T. L. Taylor
E. C. Boeck.
By
Attorneys No. 777,567.                                                  Patented December 13, 1904.

UNITED STATES PATENT OFFICE.

THOMAS L. TAYLOR AND ERIC C. BOECK, OF MEDFORD, OREGON; SAID
BOECK ASSIGNOR TO SAID TAYLOR.

PRUNING-SHEARS.

SPECIFICATION forming part of Letters Patent No. 777,567, dated December 13, 1904.

Application filed April 4, 1904. Serial No. 201,538. (No model.)

*To all whom it may concern:*

Be it known that we, THOMAS L. TAYLOR and ERIC C. BOECK, citizens of the United States, residing at Medford, in the county of Jackson and State of Oregon, have invented certain new and useful Improvements in Pruning-Shears, of which the following is a specification.

This invention relates to improvements in pruning-shears in trimming trees, bushes, shrubs, and the like; and the essential feature of the invention is to provide an implement of this type embodying an extreme simplicity of construction as well as a maximum degree of serviceability. The implement in its cutting operation has a shearing action which is found productive of excellent results in the practical use of the device, and such results are attained because of the special arrangement and coöperation of the cutting members which are comprised in the device.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of a pair of shears embodying our invention. Fig. 2 is a plan view showing the relative dispositions of the cutting-blades when closed. Fig. 3 is a side elevation more clearly illustrating the assemblance of the parts. Fig. 4 is a reversed plan view.

Corresponding and like parts are referred to in the following description and indicated in all the views of the drawings by the same reference characters.

The invention consists of three essential parts—a relatively fixed cutting-blade 1, a relatively movable cutting-blade 2, and a pivoted handle member 3. The cutting-blade 1 is curved in its length and is preferably provided with the integral handle member 4. This blade, further, is transversely widened, as at 5, and the widened portion 5 is provided with an arcuate slot 6. The handle member 3 is curved, as shown at 7, and is pivoted at one end to the transversely-widened portion 5 of the relatively fixed blade 1. The fixed blade 1 is disposed between the pivoted handle member 3 and the relatively movable blade 2, and the last-mentioned blade is pivoted at one end to the pivoted handle 3, as shown at 8. The point of pivotal support of the movable blade 2 is preferably at the curved portion 7 of the pivoted handle 3, as shown, the construction of the handle 3 being such as to admit of a maximum amount of leverage of this member. The movable blade 2, which is pivoted to the handle 3 at one end, is connected with the relatively fixed blade 1 by a pin 9, which is projected from the member 2 and received by the slot 6 of the blade 1.

From the foregoing it will be noted that the movable blade 2 is pivoted to the handle member 3 and is slidably connected with the relatively fixed blade 1, and because of the above construction a shearing action is obtained as regards the cutting coöperation of the two blades 1 and 2. The cutting-blades are sharpened from their outer sides, so as to afford a clean-cutting action thereof without bruising the adjacent portions of the parts which are cut or sheared. A spacing member 10 in the form of a washer or bushing is interposed between the end of the movable blade 2 at the point of pivotal connection thereof with the pivoted handle 3. This member properly holds the blade 2 spaced, so as to admit of free movement.

Having thus described the invention, what is claimed as new is—

In pruning-shears, and in combination, a relatively fixed curved blade transversely widened adjacent its cutting edge and provided with a handle member extended from the widened portion thereof, the transversely-widened portion thereof being provided with an arcuate slot, a second handle member curved between its ends and pivoted at its upper end to the widened portion of the relatively fixed blade, a relatively movable blade pivoted at its lower end to the pivoted handle aforesaid at the point of curvature of said handle, and a pin projected from the relatively movable blade at a point between the ends thereof and operating in the arcuate slot of the relatively fixed blade.

In testimony whereof we affix our signatures in presence of two witnesses.

THOMAS L. TAYLOR. [L. S.]
ERIC C. BOECK. [L. S.]

Witnesses:
J. W. LAWTON,
D. T. LAWTON.